J. B. PHILLIPS.
ADJUSTABLE DIE STOCK.
APPLICATION FILED MAY 6, 1909.

953,057.

Patented Mar. 29, 1910.

Witnesses

Inventor
John B. Phillips.
By
Attorney

UNITED STATES PATENT OFFICE.

JOHN B. PHILLIPS, OF WARREN, OHIO, ASSIGNOR TO THE BORDEN COMPANY, OF WARREN, OHIO, A CORPORATION OF OHIO.

ADJUSTABLE DIE-STOCK.

953,057.  Specification of Letters Patent.   Patented Mar. 29, 1910.

Application filed May 6, 1909. Serial No. 494,284.

*To all whom it may concern:*

Be it known that I, JOHN B. PHILLIPS, of Warren, in the county of Trumbull and State of Ohio, have invented certain new and useful Improvements in Adjustable Die-Stocks; and I do hereby declare the following to be a full, clear, and exact description of the invention, such as will enable others skilled in the art to which it appertains to make and use the same.

In the class of adjustable die-stocks employing rotatable cam-plates for adjusting a series of chasers it has heretofore been customary to lock such adjusting plates wholly by friction, with the result that trouble is frequently experienced because of slipping.

The object of the present invention is to provide means for positively locking the chaser-adjusting plates of die stocks and yet permit such plates to be readily and easily adjusted.

The invention will be hereinafter fully set forth and particularly pointed out in the claims.

Figure 1:
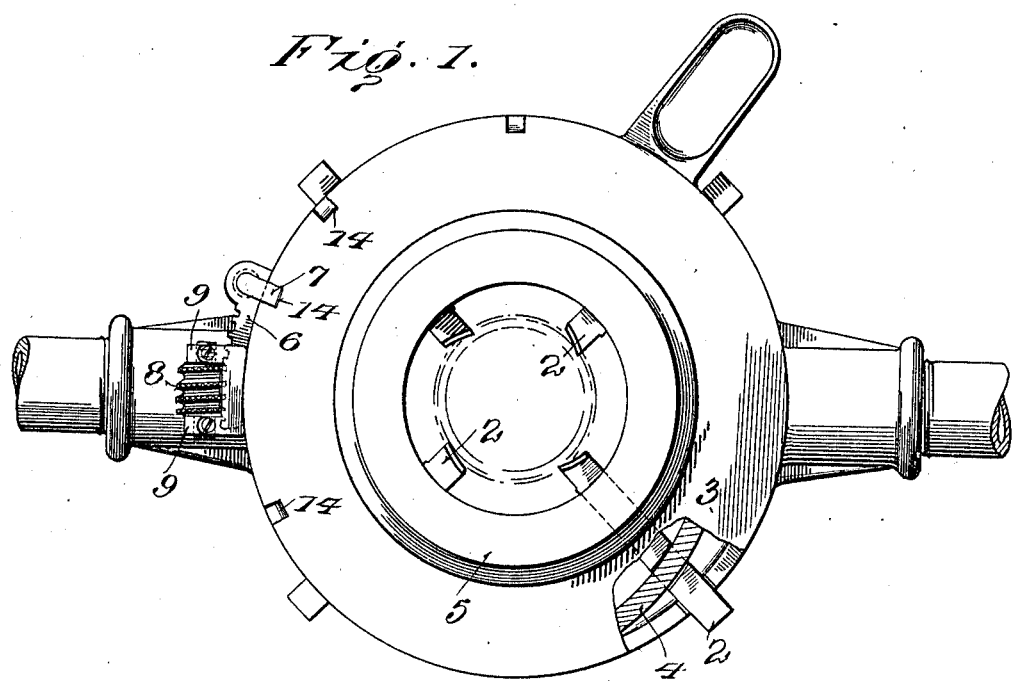
Figure 2:
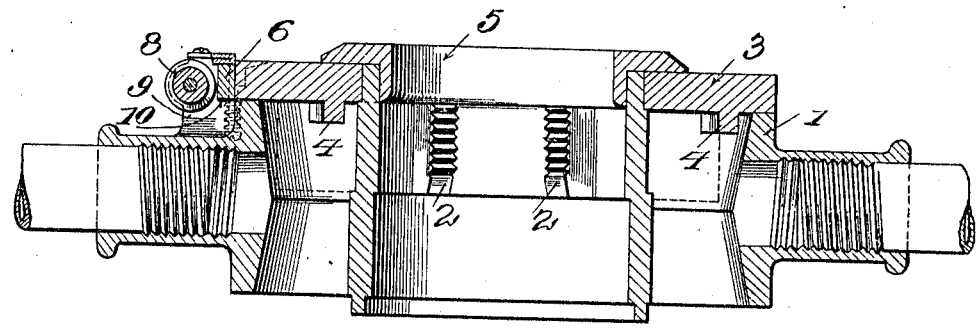
Figure 3:
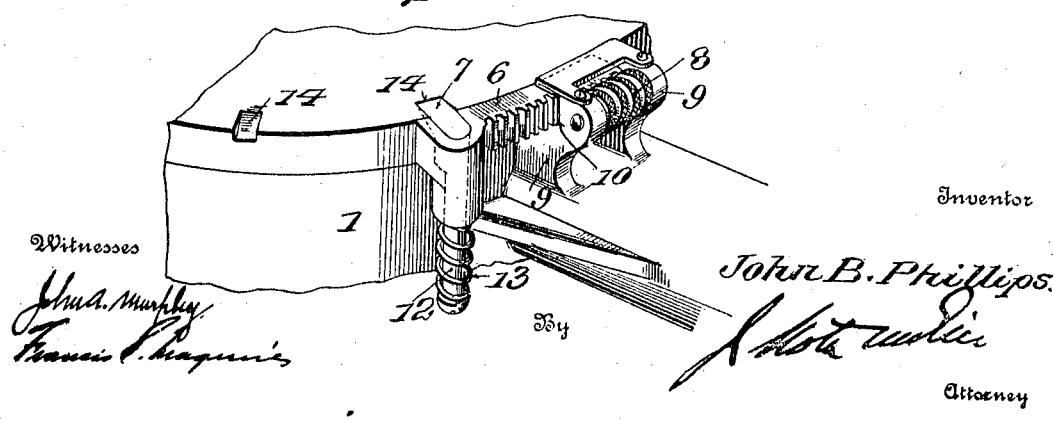

In the accompanying drawings, Figure 1 is an end elevation of a die stock embodying my present improvements. Fig. 2 is an edge view, partly in section. Fig. 3 is a detail.

Referring to the drawings, 1 designates the housing which is provided, as customary, with radial guideways for a series of chasers 2. To adapt the device for threading pipes of different sizes the chasers are, as customary, capable of being adjusted by the partial rotation of an adjusting or cam plate 3 which has an interlocking engagement with the several chasers. This may be in the form of eccentrically-arranged ribs on the inner face of the plate fitting in transverse slots in the edges of the chasers, or the latter may be equipped with lugs fitting in eccentric slots of the plate. Both of these forms are well known in the art. In the present instance I have shown ribs 4 on the underside of the adjusting plate taking in slots of the chasers. This adjusting plate may be retained on the housing by any suitable means, such as nut 5 threaded into the central tubular portion of the housing.

The means which I employ for positively locking the adjusting plate to the housing comprises a segmental rack bar 6 slightly curved to fit against the periphery of the plate with which at one end it has a positive engagement by means of a laterally-projecting lug 7. With this rack engages a worm 8 journaled at its ends in bearings 9 in the form of parallel cheeks of a bracket which is preferably integral with the housing, although if desired the bracket may be detachably secured to such housing. A guideway 10 is formed in the bracket supporting the worm-wheel to accommodate the segmental rack-bar, the inner curved face of which is securely held by the worm against the periphery of the cam plate. By turning the worm the cam-plate will be adjusted accurately to move the chasers into different positions. For this purpose the edges of the worm are roughened so as to permit it to be readily turned by a finger of the operator.

The lug 7 is formed on the end of a post 12 fitted in a bearing at one end of the rack bar, and the inwardly projecting end of the lug engages in a recess in the edge of the cam plate wherein it is held by the tension of a spring 13 acting against a head on the free end of the post. To provide for a wide range of adjustment, the cam plate is formed with two or more recesses so that by pressing on the post to compress the spring the lug may be disengaged from one recess and the plate turned axially to allow the lug to lock with a second recess. These recesses are shown at 14. When the lug thus locks the rack bar to the cam plate the desired degree of adjustment, within the range of the length of the rack bar, is secured by rotating the worm. The latter prevents the cam plate from slipping, and although such plate may be readily adjusted for threading pipes of different sizes, the described arrangement forms a positive lock for the plate in all its positions.

I claim as my invention:—

1. In an adjustable die stock having a housing, a series of radially-arranged chasers, and a rotatable cam plate having an interlocking engagement with said chasers, a rack-bar fitted against the periphery of said plate, means for detachably securing said rack bar to said plate to permit the former to be secured to the latter at different points on its periphery, and a worm mounted on said housing engaging said rack-bar.

2. In an adjustable die stock having a housing, a series of radially-arranged chasers, and a rotatable cam plate having an interlocking engagement with said chasers, a rack bar fitted against the periphery of said plate, means carried by said rack bar for detachably securing the latter to said cam plate at different points on the periphery thereof, and a worm mounted on said housing engaging said rack-bar.

3. In an adjustable die stock having a housing, a series of radially-arranged chasers, and a rotatable cam plate having an interlocking engagement with said chasers, a rack bar fitted against the periphery of said plate and having a movable lug designed to fit in a recess of said plate, and a worm mounted on said housing engaging said rack-bar.

4. The combination with a housing, a series of radially-arranged chasers, and a rotatable cam plate having an interlocking engagement with said chasers, said plate also having a recess adjacent to its periphery, of a rack-bar fitted against the periphery of said plate, a spring-held post carried by said rack-bar having a laterally-projecting lug designed to fit in said recess, a worm-wheel engaging said rack-bar, and a support for said worm having a guideway for said rack-bar.

In testimony whereof, I have signed this specification in the presence of two subscribing witnesses.

JOHN B. PHILLIPS.

Witnesses:
WM. W. BECHTEL,
GRANDON MORAN.